United States Patent [19]
Tolbert

[11] Patent Number: 5,474,493
[45] Date of Patent: Dec. 12, 1995

[54] APPARATUS FOR PLACING RANDOMLY DEPOSITED ITEMS IN A SINGLE FILE

[75] Inventor: Herman H. Tolbert, Bokoshe, Okla.

[73] Assignee: Roger D. Pugh, Greenwood, Ark.; a part interest

[21] Appl. No.: 371,875

[22] Filed: Jan. 12, 1995

[51] Int. Cl.⁶ .............................. B65G 47/24; A22B 5/00
[52] U.S. Cl. .................. 452/184; 452/179; 452/182; 198/392; 198/803.16
[58] Field of Search ............................ 452/184, 179, 452/181, 182, 183, 177; 198/430, 431, 793, 170, 803.16, 861.6, 392

[56] References Cited

U.S. PATENT DOCUMENTS

| | | |
|---|---|---|
| 2,941,651 | 6/1960 | Hutter. |
| 3,049,215 | 8/1962 | Hutter. |
| 3,054,497 | 9/1962 | Davis et al. ............... 198/803.16 |
| 3,224,554 | 12/1965 | Moulder et al. ............... 189/392 |
| 3,471,000 | 10/1969 | Bodolay. |
| 3,561,041 | 2/1971 | Szymanski. |
| 4,279,336 | 7/1981 | Henderson. |
| 4,526,269 | 7/1985 | Henderson. |
| 4,578,001 | 3/1986 | Ochs et al. ............... 198/392 |
| 4,610,345 | 9/1986 | Spreen et al. ............... 198/392 |
| 4,705,156 | 11/1987 | Boling. |
| 4,830,172 | 5/1989 | Hilton. |
| 4,962,842 | 10/1990 | Limoni. |
| 5,044,487 | 9/1991 | Spatafora. |
| 5,372,236 | 12/1994 | Layer ............... 198/392 |

FOREIGN PATENT DOCUMENTS 2385623 12/1978 France ............... 198/803.16

Primary Examiner—Willis Little
Attorney, Agent, or Firm—Joseph F. DePumpo

[57] ABSTRACT

An apparatus for placing items such as poultry carcasses in a single file is disclosed which includes a rotatable cone having an outer periphery, a conveyor belt dispersed about the outer periphery of the rotatable cone and a guide means for effecting disposal of the items in a single file.

23 Claims, 5 Drawing Sheets

APPARATUS FOR PLACING RANDOMLY DEPOSITED ITEMS IN A SINGLE FILE

FIELD OF THE INVENTION

This invention relates generally to poultry processing equipment, and in particular to an apparatus for placing poultry carcasses that are deposited in bulk into a single file so that they may be conveyed to a downstream station for further processing.

1. Background of the Invention

Various systems for sorting chicken carcasses by weight are employed in poultry processing facilities. Traditionally, conveyor lines commonly referred to in the industry as "shackle lines" have been used for that purpose. Those systems require that each chicken carcass be hung by its legs from a "shackle" and transported on the conveyor line to a downstream weighing station where it is weighed and then transported further to a release station where the chicken is automatically released from the shackle into a container of chickens of like weight range. Since each chicken must be manually placed on the shackle line, utilization of that systemm is a very labor intensive and tedious process.

To partially overcome the problems associated with the shackle line systems, weighing systems in which a conveyor belt carries the chickens to a weighing station disposed along the conveyor belt path are commonly utilized. These systems typically employ a plurality of arms or "flappers" that are positioned downstream of the weighing station to deflect each individual carcass to an area or a container designated for chickens having a like weight range.

Utilization of the latter system requires that each carcass enter the weighing station in a single file. Heretofore, the chicken carcasses have been manually placed on the conveyor belt in a single file upstream of the weighing station. Thus, the tedious manual labor associated with preparing the carcasses to be weighed and sorted by weight has not been eliminated by these systems.

2. Description of the Prior Art

Machines for placing a bulk of uniformly sized and relatively hard articles such as rocks, pills, bottle caps, nuts and various types of fruits into a single file are known.

For example, one prior art single filing device includes a rotating bowl having an interior conical surface, and a stationary ramp having tongue members which fit into groove members disposed in the outer periphery of the conical surface. The articles are fed in bulk onto the conical surface where they gravitate to the outer periphery and then slide up the ramp in a single file to an outer rim of the bowl.

In another approach, the articles to be placed in a single file are deposited in bulk onto the center of a rotating horizontal table having a plurality of radial pockets at the top periphery of the table. The radial pockets are opened and closed by triangular gates at their entry ends which open and shut as the table rotates so that only one object at a time is permitted into each receiving pocket.

These and other prior art approaches are entirely unsatisfactory for placing items such as poultry and similar carcasses into a single file. This is because the carcasses tend to be relatively soft and sticky and as such tend to adhere to each other and resist sliding. Moreover, due to their asymmetrical shape, they do not roll easily, and if caused to roll, their shape combined with their springy texture creates a tendency for them to bounce making them difficult to control.

Accordingly, there is a need for a new and improved apparatus for placing items such as poultry and similar animal carcasses into a single file so that they may be conveniently received at a downstream station for further processing.

SUMMARY OF THE INVENTION

In accordance with the present invention, a unique apparatus for placing randomly deposited items such as chicken carcasses in a single file is disclosed. In accordance with one important aspect of the invention, the apparatus includes a rotatable cone member having an outer periphery, a conveyer belt disposed about the outer periphery of the rotatable cone member, and a guide wall having a discharge portion.

In accordance with another aspect of the invention, the apparatus is characterized by a conveyor belt including an entry section, a progressively elevating section, a removal section and a return section. The entry section is disposed adjacent the outer periphery of the rotatable cone member so that items deposited in bulk onto the conical surface of the rotatable cone member gravitate to the entry section of the conveyor belt and are ushered through the progressively elevating section to the removal section of the conveyor belt.

In accordance with another aspect of the invention, the guide wall extends gradually across the removal section of the conveyor belt so that the effective width of the removal section progressively decreases to a discharge portion that is disposed a predetermined distance from the inner edge of the conveyor belt. Accordingly, if two or more items traveling on the conveyor belt in the removal section are in a side-by-side orientation, only one item is permitted to pass by the discharge portion, with the remaining items falling back to the conical surface of the rotatable cone member so that items exiting the removal section are in a single file.

In accordance with another aspect of the invention, a wiper bar extends above and across the removal section of the conveyor belt for eliminating stacking of the items.

In accordance with yet another aspect of the invention, a guide rail having a curved end engages the items that are hanging partially over the inner edge of the conveyor belt in the removal section and causes them to move fully onto the conveyor belt.

In accordance with still another aspect of the invention, the return section of the conveyor belt includes a washing system for advantageously removing undesirable material from the surface of the belt.

Advantages of the Invention

An advantage of the present invention is that it provides a mechanically uncomplicated and relatively inexpensive device for placing items, particularly poultry and similar carcasses that are deposited in bulk into a single file.

Yet another advantage of the present invention is that it is easy to keep clean and inexpensive to maintain.

Still another advantage of the present invention is that it provides a uniquely adjustable guide wall that extends across the conveyor belt to effect disposal of the items in a single file on the conveyor belt.

As will become more apparent hereinafter, the present invention provides a new and improved apparatus for placing randomly deposited items in a single file. The apparatus can be effectively utilized in many applications, and it achieves the foregoing advantages in a novel and unobvious manner.

BRIEF DESCRIPTION OF THE DRAWINGS

Referring now to the drawings in which like reference numerals and letters indicate corresponding elements throughout several views.

DETAILED DESCRIPTION OF A PREFERRED EMBODIMENT

Figure 1:
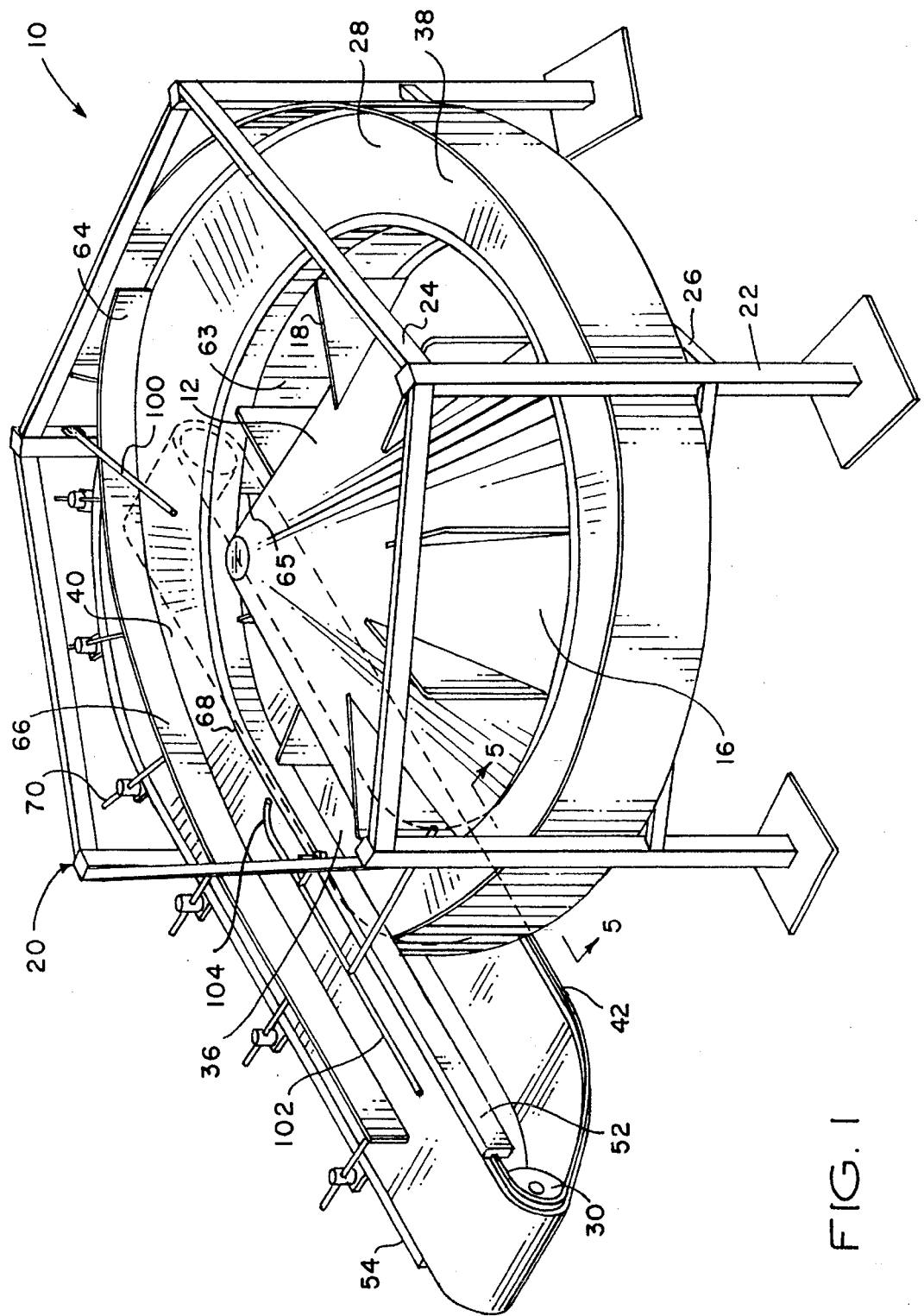
FIG. 1 is a general perspective view of the apparatus for placing randomly deposited items in a single file in accordance with the present invention.

In the description which follows, like parts are marked throughout the specification and drawings with the same reference numerals, respectively. The drawing figures are not necessarily drawn to scale and the proportions of certain parts have been exaggerated for purposes of clarity.

As shown in the exemplary drawings, the present invention is embodied in a novel and unique apparatus for placing randomly deposited items such as dressed poultry in a single file so that they may be conveniently received at a downstream station for further processing such as inspection, weighing, sorting and the like.

Figure 3:
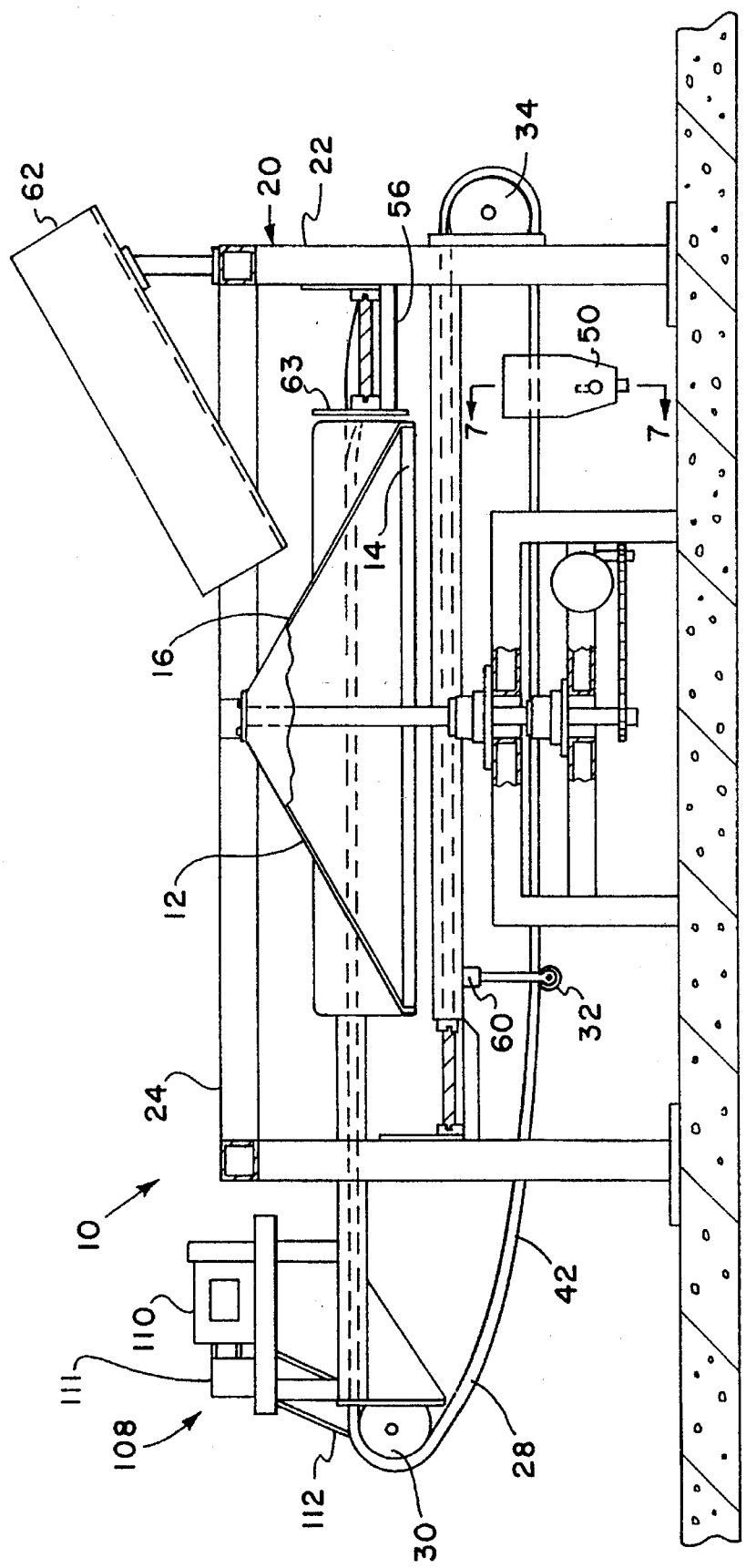
FIG. 3 is a section view taken generally along line 3—3 of FIG. 2.

Referring now to FIGS. 1 and 3, an apparatus for placing randomly deposited items in a single file 10 constructed in accordance with the principles of the present invention. includes a rotatable cone member 12 having an outer periphery 14 and a conical surface 16 with a plurality of spaced separator blades 18. The apparatus 10 includes a frame 20 comprising circumferentially spaced stanchions 22 interconnected by upper and lower lateral braces 24, 26 which is adapted to support an endless conveyor belt 28.

Figure 2:
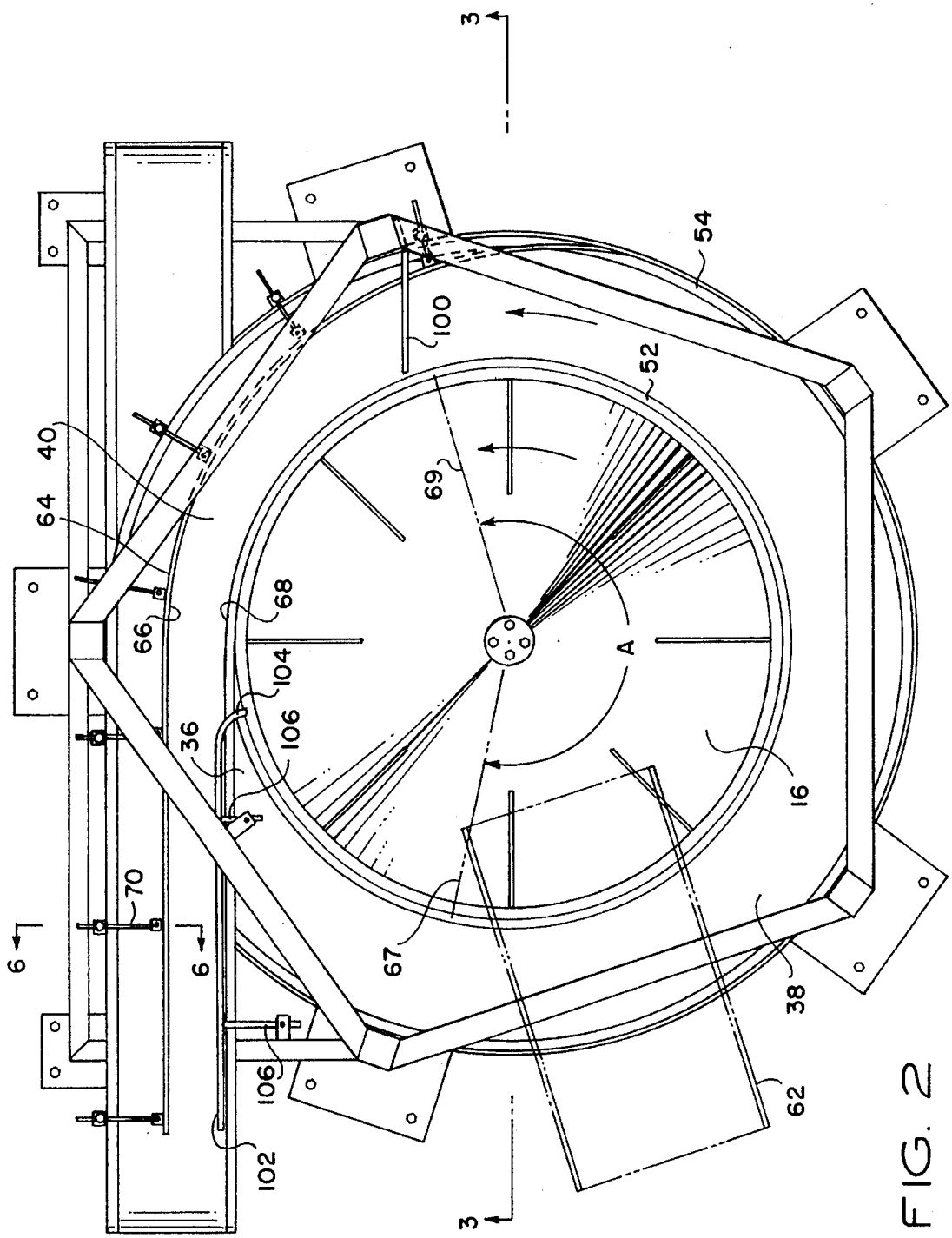
FIG. 2 is a top plan view of the apparatus shown in FIG. 1.

The conveyer belt 28 may be of the type manufactured by Intralox, Inc., New Orleans, La. as a series 2200, constructed of polypropylene for normal applications or polyethylene for applications involving elevated temperatures. The conveyor belt 28 is disposed about the outer periphery 14 of the rotatable cone member 12 and is trained about a drive roller 30, an idler roller 32 and a return roller 34. As shown in FIGS. 1 and 2, the conveyer belt 28 includes an entry section 36, a progressively elevating section 38, a removal section 40 and a return section 42, and its radially inner and outer edges 44, 46 each comprise an edge tab 48 (see FIG. 5). The return section 42 includes a washing system 50 which is shown generally in FIG. 3 for advantageously removing poultry detritus and other undesirable material from the conveyor belt 28.

Figure 5:
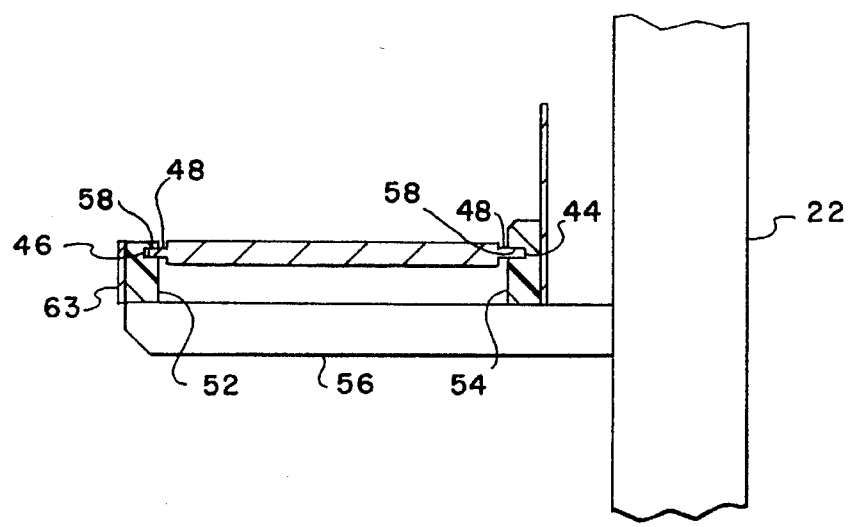
FIG. 5 is a section view of a portion of the conveyor belt support structure taken along line 5—5 of FIG. 1.

As best illustrated in FIGS. 1, 2 and 5, radially inner and outer guide members 52, 54, respectively, are disposed about the inner and outer edges 44, 46 of the conveyor belt for supporting and guiding the conveyor belt. As best illustrated in FIG. 5, the guide members 52, 54 are supported by the frame 20 through the provision of support bars 56 which extend laterally from each stanchion 22, respectively. In accordance with this arrangement, each guide member 52, 54 includes a slotted section 58 in which the edge tabs 48 of the conveyor belt 28 ride to guide the conveyor belt through the entry section 36, the progressively elevating section 38 and the removal section 40. Moreover, a plurality of support beams 60, only one of which is shown (see FIG. 3), are provided at various locations along the path of the conveyor belt between the inner and outer guide members 52, 54 to maintain the proper distance between the guide members 52, 54.

The items to be arranged in a single file are deposited through a loading chute 62, which is preferably oriented as shown in FIG. 2, but may alternatively be located as shown in FIG. 3, and onto the conical surface 16 of the rotatable cone 12 in a bulk fashion. The items then gravitate, slide or roll, down the conical surface 16 and onto the entry section 36 of the conveyor belt where they are ushered through the progressively elevating section 38 to the removal section 40 of the conveyer belt 28.

However, as shown in FIG. 1, a retaining wall 63 extends partially around the cone in a counterclockwise direction from the onset of the progressively elevating section 38 to a distal end 65 and increases in height in accordance with the ascent of the progressively elevating section 38 of the conveyor belt. The retaining wall 63 is suitably supported by inner guide member 52 as shown by way of example in FIGS. 3 and 5.

An adjustable guide wall 64 is disposed above and extends gradually across the removal section 40 of the conveyer belt 28 to a discharge portion 66 disposed a predetermined distance from the inner edge 68 of the conveyor belt 28 so that the effective width of the conveyor belt 28 at the discharge portion 66 is such that only a single item, such as a poultry carcass, is permitted to pass therethrough.

Accordingly, if two or more items are in a side-by-side orientation with respect to each other, only one item is permitted to pass through the discharge portion 66 of the guide wall 64, with the remaining items falling back to the conical surface 16 of the rotatable cone 12 where they once again gravitate to the entry section 36 of the conveyer belt 28 and are ushered through the progressively elevating section 38 to the removal section 40.

Figure 6:
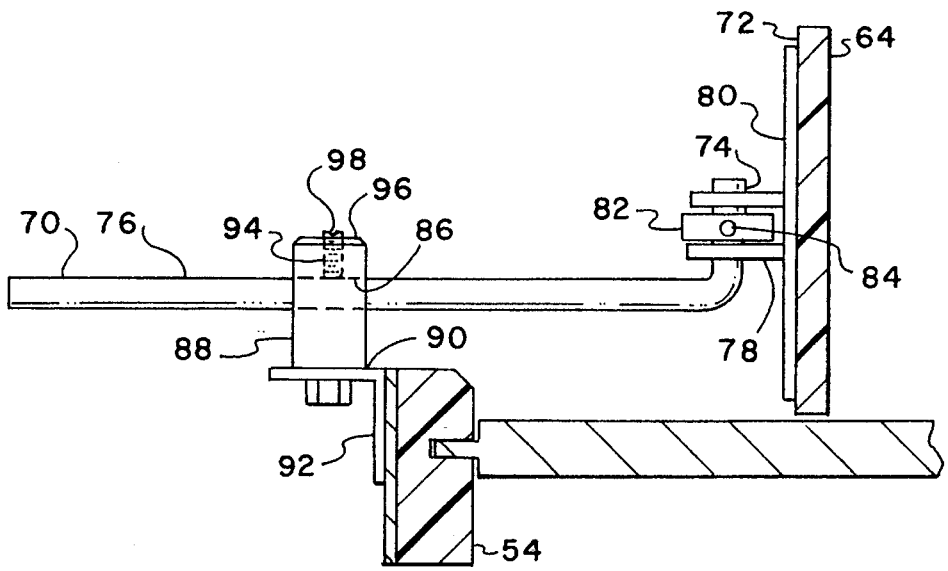
FIG. 6 is a section view of the adjustable guide wall taken along line 6—6 of FIG. 2.

As shown in FIG. 6, the location of the guide wall 64 with respect to the inner edge 68 of the conveyor belt 28 is adjustable by provision of plural, spaced apart rods 70 which engage and are removably secured to the back side 72 of the guide wall 64. Each rod has a distal end 74 extending normal to the main portion 76 of the rod 70 which extends through a clevis 78 on a guide wall support bracket 80 and is secured to the clevis 78 by a collar 82 having a retaining pin 84 extending therethrough. The main portion 76 of the rod extends through an aperture 86 in a support column 88 which is secured to the outer guide member 54 at one end 90 through an L-shaped bracket 92. The support column 88 includes a bore 94 at its opposite end 96 which is adapted to receive a set screw 98.

As best illustrated in FIG. 1, a wiper bar 100 is secured to one of the upright stanchions 22 and extends above and across the conveyor belt 28 to insure that items that are stacked or partially stacked upon other items are displaced back to the conveyor belt 28.

Referring to FIGS. 1 and 2, a guide rail 102 having a curved end 104 is secured to the frame 20 by support members 106. The curved end 104 engages the items that are disposed partially over the inner edge 68 of the conveyor belt 28 causing them to move fully onto the conveyor belt.

As best illustrated in FIG. 3, the belt conveyer system 108 comprises an electric motor 110, such as the type manufactured by U.S. Motors, Inc. as Model No. 8835. The electric motor 110 is connected to a gearbox 111 having an output shaft mechanically connected to a drive sprocket (not shown), and an endless chain 112 is entrained about the drive sprocket and a driven sprocket (not shown). The driven sprocket is mechanically connected to the drive roller 30 which drivingly engages the conveyer belt 28.

Figure 4:
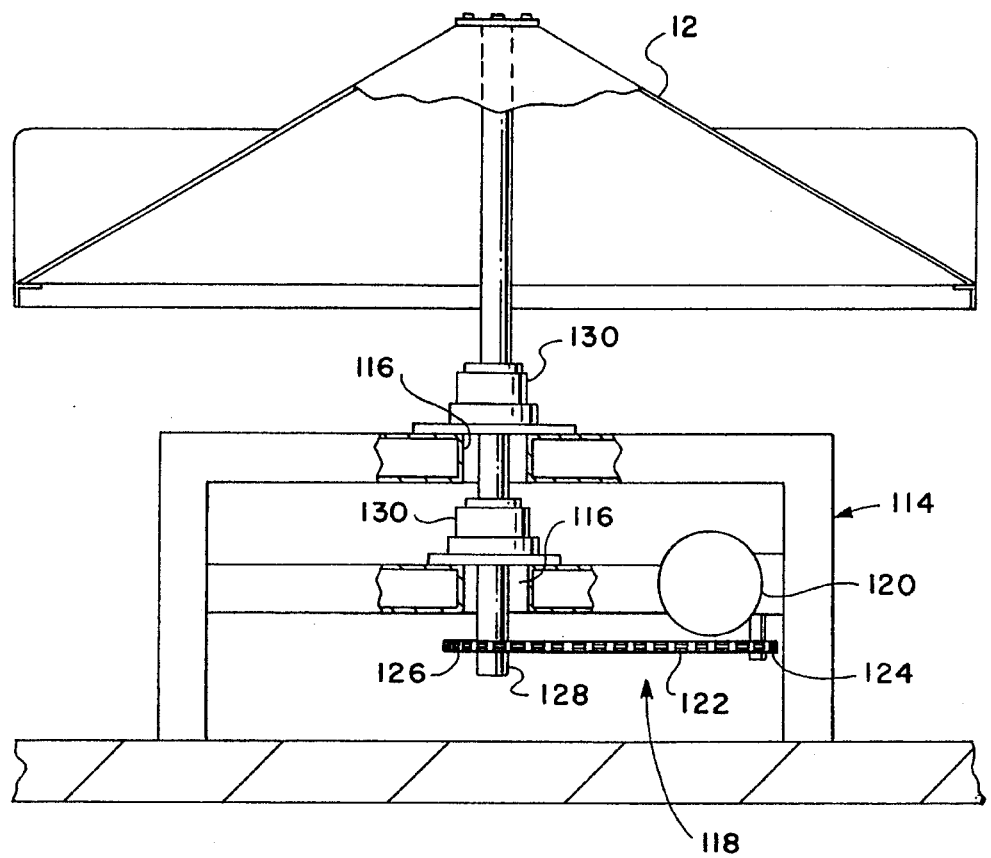
FIG. 4 is a detail section view of the rotatable cone member taken along the same line as FIG. 3 on a larger scale.

Referring now to FIG. 4, the rotatable cone 12 is supported by a base generally designated as 114 having apertures 116 extending therethrough. The drive system 118 for the rotatable cone 12 includes an electric motor 120 connected to a gearbox (not shown), an endless chain 122 entrained about a drive sprocket 124 and a driven sprocket 126, and a drive shaft 128 that extends through the apertures 116 and which is supported for rotation by bearings 130. As with the belt conveyer system 108, a suitable electric motor is the type manufactured by U.S. Motors, Inc. as Model No. 8835.

Figure 7:
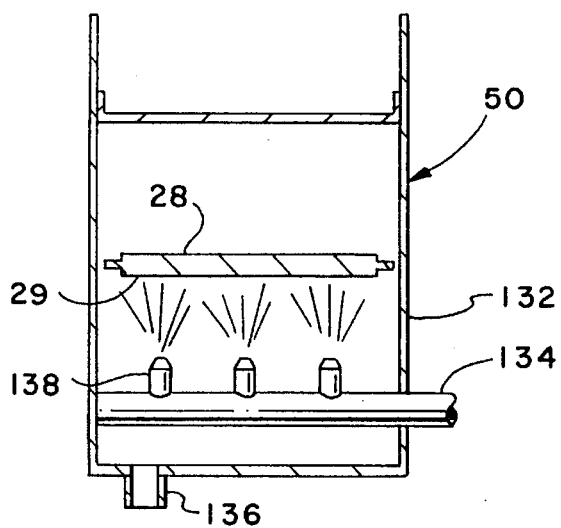
FIG. 7 is a section view depicting the belt washing system taken along line 7—7 of FIG. 1.

As illustrated in FIG. 7, the washing system 50 of the present invention includes a housing 132 having an inlet nozzle 134 that is connected to a water supply (not shown), and an outlet nozzle 136 that can be connected to a drain (not shown). The inlet nozzle 134 is in flow communication with a plurality of spray nozzles 138 that are oriented to direct pressurized water to the underside 29 of the belt 28.

The guide wall 64 and the guide members 52, 54 may be constructed of ultra-high molecular weight polymer, commonly known as UHMW, such as the type manufactured by Poly-Hi, a division of the Manasha Corporation, Ft. Wayne, Ind., as Tivar-100. Tivar-100 polymer material complies with the F.D.A. requirements for use in food contact applications and its surface characteristics allow items such as chicken carcasses to slide thereon. Those components of apparatus 10 not specifically mentioned may be made of conventional engineering materials normally used for similar processing apparatus.

The operation of the apparatus 10 will now be described. Referring to FIGS. 1, 2 and 3, poultry items in substantial numbers are distributed through the loading chute 62 and onto the conical surface 16 of the rotatable cone 12. The rotatable cone 12 and the conveyer belt 28 rotate in the same direction as shown by the arrows in FIG. 2. The loading chute 62 is preferably oriented for depositing the poultry items onto the section of the conical surface 16 delineated by area A (see FIG. 2) so that the poultry items ride along the retaining wall 63 for a period of time after gravitating down the conical surface 16. This provides for a gradual migration of the poultry items onto the entry section 36 of the conveyer belt 28.

When the poultry items or carcasses clear the distal end 65 of the wall 63 they fall radially outward onto the entry section 36 of the conveyer belt 28. The conveyer belt 28 carries the poultry items through the progressively elevating section 38 to the removal section 40 wherein any stacking is eliminated by the wiper bar 100 and where the guide wall gradually reduces the effective width of the removal section 40. At the discharge portion 60 of the guide wall 64, any poultry items that are not in a single file fall from the inner edge 68 of the conveyer belt 28 onto the rotatable cone 12 where they once again enter the conveyer belt at the entry section and are ushered through the progressively elevating section 38 to the removal section 40.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention can be limited not by this detailed description, but rather by the claims appended hereto.

I claim:

1. An apparatus for placing items in a single file comprising:

a rotatable cone member having a conical surface and an outer periphery;

a conveyer belt disposed about the outer periphery of said rotatable cone member, said belt having an inner edge, an entry section, a progressively elevating section, a removal section and a return section, the entry section being disposed adjacent the outer periphery of said cone member and the removal section being at a higher elevation than the entry section; and guide means disposed at the removal section for effecting disposal of said items in a single file along said conveyor belt.

2. The apparatus of claim 1 wherein the guide means extends across the removal section so that the effective width of the removal section is reduced.

3. The apparatus of claim 2 wherein the guide means includes a guide wall having a discharge portion disposed a predetermined distance from the inner edge of said conveyor belt and supported by a plurality of spaced support members.

4. The apparatus of claim 3 including means for selectively positioning each support member.

5. The apparatus of claim 4 wherein the support members comprise elongated rods and the means for selectively positioning each rod comprises a support column adapted to support the rod selectively.

6. The apparatus of claim 1 including a wiper bar disposed above the conveyor belt for eliminating stacking of said items.

7. The apparatus of claim 1 including a guide rail for moving said items disposed partially over the inner edge of said conveyor belt in the removal section fully onto said conveyor belt.

8. The apparatus of claim 1 wherein said return section includes belt washing means.

9. The apparatus of claim 8 wherein the belt washing means comprises a housing having a plurality of spray nozzles for spraying fluid onto said conveyor belt.

10. The apparatus of claim 1 wherein the conical surface has a plurality of spaced apart separator blades extending therefrom.

11. The apparatus of claim 1 including a loading chute for directing the items onto the conical surface of said rotatable cone member.

12. An apparatus for placing items in a single file comprising:

a rotatable cone member having a conical surface and an outer periphery, the conical surface having a plurality of spaced separator blades for separating a plurality of the items randomly deposited on the conical surface;

a conveyer belt disposed about the outer periphery of said rotatable cone member for receiving items deposited on said rotatable cone member and having a removal section; and a guide wall extending at least partially across the removal section for guiding items on said conveyor belt into a single file.

13. The apparatus of claim 12 wherein said conveyor belt is endless and includes an entry section, a progressively elevating section and a return section.

14. The apparatus of claim 13 wherein the entry section is disposed adjacent the outer periphery of said rotatable cone member.

15. The apparatus of claim 14 wherein said rotatable cone member includes a portion adjacent said removal section for receiving items removed from said removal section when said items are forced into a single file relationship on the removal section.

16. The apparatus of claim 15 wherein the return section includes belt washing means.

17. The apparatus of claim 16 wherein the guide wall includes a discharge portion disposed a predetermined distance from the inner edge of said conveyor belt for defining the width of an item so that said items are traversed in a single file along said conveyor belt.

18. The apparatus of claim 17 including a wiper bar disposed above said conveyor belt for eliminating stacking of said items.

19. The apparatus of claim 18 including a guide rail for moving said items disposed partially over the inner edge of said conveyor belt in the removal section fully onto said conveyor belt.

20. An apparatus for placing items such as poultry carcasses in a single file comprising:

- a rotatable cone member having an outer periphery;
- a conveyer belt having an inner edge and a removal section and being disposed about the outer periphery of said rotatable cone member; and
- a guide wall having a discharge portion and extending at least partially across the removal section so that the discharge portion is disposed a predetermined distance from the inner edge of said conveyer belt for effecting disposal of said items in a single file along said conveyor belt.

21. The apparatus of claim 20 including a wiper bar disposed above the conveyor belt for eliminating stacking of said chicken carcasses.

22. The apparatus of claim 21 wherein said conveyor belt includes a return section having belt washing means.

23. An apparatus for placing items such as poultry carcasses in a single file comprising:

- a rotatable cone member including a conical surface and an outer periphery, the conical surface having a plurality of substantially equally spaced separator blades for separating a plurality of items randomly deposited on the conical surface in a bulk fashion;
- a conveyer belt disposed about the outer periphery of said rotatable cone member, said belt having an inner edge, an entry section, a progressively elevating section, a removal section and a return section, the entry section being disposed below the outer periphery of said cone member and the removal section being at a higher elevation than the entry section;
- a guide wall having a discharge portion and being mounted above and extending at least partially across the removal section of said conveyor belt so that the discharge portion is disposed a predetermined distance from the inner edge of said conveyor belt for effecting disposal of said items in a single file along said conveyor belt; and
- a wiper bar extending above and across the removal section of said conveyor belt for eliminating stacking of said chicken carcasses.

* * * * *